United States Patent
Stephenson et al.

(10) Patent No.: US 6,788,362 B2
(45) Date of Patent: Sep. 7, 2004

(54) PIGMENT LAYER FOR POLYMER-DISPERSED LIQUID CRYSTAL DISPLAYS

(75) Inventors: Stanley W. Stephenson, Spencerport, NY (US); Mary C. Brick, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 4 days.

(21) Appl. No.: 10/222,396

(22) Filed: Aug. 16, 2002

(65) Prior Publication Data

US 2004/0032545 A1 Feb. 19, 2004

(51) Int. Cl.$^7$ ............................................ G02F 1/1333
(52) U.S. Cl. ......................................................... 349/86
(58) Field of Search .................................. 349/86, 2, 95, 349/21, 165, 183, 10, 84

(56) References Cited

U.S. PATENT DOCUMENTS

| | | | |
|---|---|---|---|
| 3,600,060 A | | 8/1971 | Churchill et al. |
| 3,816,786 A | | 6/1974 | Churchill et al. |
| 4,435,047 A | | 3/1984 | Fergason |
| 4,840,463 A | * | 6/1989 | Clark et al. .................. 349/172 |
| 4,941,735 A | * | 7/1990 | Moddel et al. ................ 349/29 |
| 5,251,048 A | | 10/1993 | Doane et al. |
| 5,305,126 A | * | 4/1994 | Kobayashi et al. ............ 349/94 |
| 5,625,473 A | * | 4/1997 | Kondo et al. .................. 349/86 |
| 5,680,185 A | * | 10/1997 | Kobayashi et al. ............ 349/88 |
| 5,847,786 A | * | 12/1998 | Shimada et al. ............... 349/86 |
| 5,963,283 A | * | 10/1999 | Omae et al. .................. 349/86 |
| 6,310,675 B1 | * | 10/2001 | Yaniv .......................... 349/141 |
| 6,433,843 B1 | * | 8/2002 | Okada et al. .................. 349/78 |
| 2002/0089625 A1 | | 7/2002 | Grupp |

* cited by examiner

Primary Examiner—Thien M. Le
Assistant Examiner—Edwyn Labaze
(74) Attorney, Agent, or Firm—Chris P. Konkol

(57) ABSTRACT

A display having polymer dispersed liquid crystals, which display comprises a transparent substrate; a layer comprising polymer-dispersed cholesteric liquid crystal disposed over the substrate, which layer has more than one stable optical state in the absence of an electrical field. The display further comprises a first transparent conductor disposed between the state changing layer and the transparent support, a second conductor on the other side of the state changing layer so that when a field is applied between the first and second conductors, the liquid crystals change state. It has been found advantageous to have a non-conductive, non-field spreading dark layer of sub-micron pigments in a binder for providing an improved light absorbing function, which dark layer is disposed between the layer of polymer-dispersed cholesteric liquid crystal and the second conductor.

29 Claims, 5 Drawing Sheets

PIGMENT LAYER FOR POLYMER-DISPERSED LIQUID CRYSTAL DISPLAYS

CROSS REFERENCE TO RELATED APPLICATIONS

Reference is made to commonly-assigned U.S. patent application Ser. No. 09/799,220, filed Mar. 5, 2001, U.S. patent application Ser. No. 09/915,441, filed Jul. 26, 2001, U.S. patent application Ser. No. 10/036,149, filed Dec. 26, 2001, U.S. patent application Ser. No. 10/134,185, filed Apr. 29, 2002, the disclosures of which are incorporated herein by reference.

FIELD OF THE INVENTION

The present invention relates to a display sheet having a cholesteric liquid layer that can change states to provide a viewable image.

BACKGROUND OF THE INVENTION

Currently, information is displayed using assembled sheets of paper carrying permanent inks or displayed on electronically modulated surfaces such as cathode ray displays or liquid crystal displays. Other sheet materials can carry magnetically written areas to carry ticketing or financial information, however magnetically written data is not visible.

Media systems exist that maintain electronically changeable data without power. Such system can be electrophoretic (Eink), Gyricon or polymer dispersed cholesteric materials. An example of electronically updateable display can be found in U.S. Pat. No. 3,600,060 issued Aug. 17, 1971 to Churchill that shows a device having a coated then dried emulsion of cholesteric liquid crystals in aqueous gelatin to form a field responsive, bistable display. U.S. Pat. No. 3,816,786 discloses a layer of encapsulated cholesteric liquid crystal responsive to an electric field. The electrodes in the patent can be transparent or non-transparent and formed of various metals or graphite. It is disclosed that one electrode must be light absorbing and it is suggested that the light absorbing electrode be prepared from paints containing conductive material such as carbon.

Fabrication of flexible, electronically written display sheets is disclosed in U.S. Pat. No. 4,435,047 issued Mar. 6, 1984 to Fergason. A substrate supports a first conductive electrode, one or more layers of encapsulated liquid crystals, and a second electrode of electrically conductive ink. The conductive inks form a background for absorbing light, so that the display areas appear dark in contrast to non-display areas. Electrical potential applied to opposing conductive areas operates on the liquid crystal material to expose display areas. Because the liquid crystal material is nematic liquid crystal, the display ceases to present an image when de-energized.

The patent discloses the use of dyes in either the polymer encapsulant or liquid crystal material to absorb incident light. The dyes are part of a solution, and not solid submicron particles. The patent further discloses the use of a chiral dopant in example 2. The dopant improves the response time of the nematic liquid crystal, but does not create a light-reflective state. The display structures disclosed are not bistable in the absence of an electrical field.

U.S. Pat. No. 5,251,048 discloses a light-modulating cell having a polymer dispersed chiral nematic liquid crystal. The chiral nematic liquid crystal has the property of being electrically driven between a planar state reflecting a specific visible wavelength of light and a light scattering focal-conic state. Chiral nematic liquid crystals, also known as cholesteric liquid crystals, have the capacity of maintaining one of multiple given states in the absence of an electric field. Black paint is applied to the outer surface of rear substrate to provide a light absorbing layer outside of the area defined by the intersection of segment lines and scanning lines.

U.S. Ser. No. 2002/0089625 to Grupp discloses disposing, in reflective liquid crystal display devices, the absorbent black layer which is usually deposited on the lower face of the back substrate, and arranging it at a higher level than the level of said back substrate. In this way, the number of so-called parasite reflections or back scatter of the incident light at the interfaces between two materials or mediums of different indices is reduced. This allows the display contrast to be improved. In FIG. 4, Grupp discloses a polymer dispersed liquid crystal device having a first group of transparent electrodes and a second group of electrodes. A black colored absorbent layer made of electrically non-conductive material that is an insulating lacquer, Heatsink-paste® HSP 2741 by Lack Verke GmbH. The invention of Grupp requires separate processes for depositing the absorbent black layer and the second conductor. In addition, there is no mention of providing an index match between the absorbent black layer and the polymer used in the polymer dispersed liquid crystal layer. It would be advantageous for the absorbent layer to be disposed between the polymer dispersed liquid crystal material and the second electrode, in order to maximize the light absorption.

It would be useful to create a light absorbing layer for a display having cholesteric liquid crystals that has improved contrast. It would further be an improvement to codeposit the dark layer simultaneously with the deposition of the polymer dispersed liquid crystal material.

SUMMARY OF THE INVENTION

Applicants' invention is directed to a thin, dark light-absorbing layer between two thinly spaced, parallel electrodes operating on polymer-dispersed cholesteric liquid-crystal displays. Applicants have found that if the light absorbing layer for a display having polymer-dispersed cholesteric liquid crystals is not field-carrying and not electrically conductive, it is possible to position such layer between electrodes to provide improved image quality. Accordingly, the light absorbing layer does not carry a field beyond limits defined by the intersection or overlap of the two electrodes.

In particular, the invention is directed to a display having polymer dispersed liquid crystals, comprising:

a) a transparent substrate;

b) a polymer-dispersed cholesteric liquid crystal disposed over the substrate and defining first and second surfaces, such polymer-dispersed cholesteric liquid-crystal layer having more than one stable optical state in the absence of an electrical field;

c) a first transparent conductor disposed over the first surface of the state changing layer;

d) a second conductor on the second surface of the state changing layer so that when a field is applied between the first and second conductors, the liquid crystals change state; and e) a non-conductive, non-field spreading layer comprising a sub-micron pigment and binder disposed between the polymer-dispersed cholesteric liquid crystal layer and the second conductor to provide a light absorbing layer.

The present invention maximizes light absorption in a pigment-containing layer, while preventing field spreading beyond the perimeter of the second electrode. Fine, preferably sub-micron, particles of pigment in a binder provide an electro-chemically stable light absorber.

DETAILED DESCRIPTION OF THE PREFERRED EMBODIMENT

Figure 1:
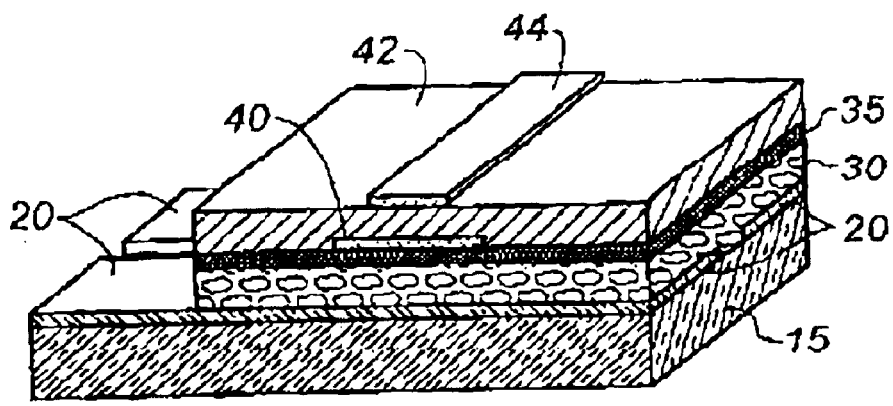
FIG. 1 is a perspective of a first polymer-dispersed material display used with the present invention.

FIG. 1 is a perspective of a polymer dispersed material display generally designated 10, made in accordance with the present invention. Display 10 includes a flexible display substrate 15, which is a thin transparent polymeric material, such as Kodak Estar film base formed of polyester plastic that has a thickness of between 20 and 200 microns. In an exemplary embodiment, display substrate 15 can be a 125-micron thick sheet of polyester film base. Other polymers, such as transparent polycarbonate, can also be used.

One or more first transparent conductors 20 are formed on display substrate 15. First transparent conductors 20 can be tin-oxide, indium-tin-oxide (ITO), or polythiophene, with ITO being the preferred material. Typically the material of first transparent conductors 20 is sputtered or coated as a layer over display substrate 15 having a resistance of less than 1000 ohms per square. First transparent conductors 20 can be formed in the conductive layer by conventional lithographic or laser etching means.

Light modulating layer 30 overlays a first portion of first transparent conductor(s) 20 and has an exposed portion, exposed first conductor 20' to provide electrical contact to first transparent conductors 20. Light modulating layer 30 contains cholesteric liquid crystal material, such as those disclosed in U.S. Pat. No. 5,695,682 issued Dec. 9, 1997 to Doane et al., the disclosure of which is incorporated by reference. Application of electrical fields of various intensity and duration can be employed to drive a chiral nematic material (cholesteric) into a reflective state, to a light scattering state, or an intermediate state. These materials have the advantage of having first and second optical states that are both stable in the absence of an electrical field. The materials can maintain a given optical state indefinitely after the field is removed. Cholesteric liquid crystal materials can be Merck BL112, BL118 or BL126, available from E.M. Industries of Hawthorne, N.Y.

In a preferred embodiment, light modulating layer 30 is E.M. Industries' cholesteric material BL-118 dispersed in deionized photographic gelatin. The liquid crystal material is mixed at 8% concentration in a 5% gelatin aqueous solution. The mixture is dispersed to create an emulsion having 8–10 micron diameter domains of the liquid crystal in aqueous suspension. The domains can be formed using the limited coalescence technique described in Copending U.S. patent application Ser. No. 09/478,683 filed Jan. 6, 2000 by Stephenson et al., allowed Mar. 7, 2002. The emulsion is coated on a polyester display substrate over the first transparent conductor(s) and dried to provide an approximately 9-micron thick polymer dispersed cholesteric coating. Other organic binders such as polyvinyl alcohol (PVA) or polyethylene oxide (PEO) can be used in place of the gelatin. As coated and dried, without further treatment, the material is in a light reflective planar state. Such emulsions are machine coatable using coating equipment of the type employed in the manufacture of photographic films. A gel sub layer can be applied over the first transparent conductors 20 prior to applying light modulating layer 30 as disclosed in U.S. Pat. No. 6,423,368 by Stephenson et al.

In FIG. 1, second conductors 40 overlay dark layer 35. Second conductors 40 have sufficient conductivity to induce an electric field between the first and second conductors across light modulating layer 30 strong enough to change the optical state of the polymeric material. Second conductors 40 can be formed, for example, by the well known technique of vacuum deposition for forming a layer of conductive material such as aluminum, tin, silver, platinum, carbon, tungsten, molybdenum, tin or indium or combinations thereof. The layer of conductive material can be patterned using well known techniques of photolithography, laser etching or by application through a mask.

In a preferred embodiment, second conductors 40 are formed by screen printing a conductive ink such as Electrodag® 423SS screen printable electrical conductive material from Acheson Corporation. Such screen printable conductive materials comprise finely divided graphite particles in a thermoplastic resin. Screen printing is preferred to minimize the cost of manufacturing the display. Providing sufficient amount of polymer to pigment in dark layer 35 creates a printable surface on dark layer 35.

Again referring to embodiment of FIG. 1, a dielectric layer 42 can be provided over second conductors 40. The dielectric layer 42 is provided with through via 43 (shown in FIG. FIG. 9A) that permit interconnection between second conductors 40 and conductive row contacts 44. The dielectric layer 42 can be formed, for example, by printing or coating a polymer such as vinyl dissolved in a solvent. Providing sufficient amount of polymer to pigment in dark layer 35 creates a printable surface on dark layer 35. Row contacts 44 can be formed by screen printing the same screen printable, electrically conductive material used to form second conductors 40. The row contacts 44 enable the connection of sets of second conductors 40 to create functional rows of electrically addressable areas in the polymer dispersed layer. The row contacts and the exposed first conductors 20' form a set of backside display contacts that are used to electrically address the display.

The use of: a flexible support for display substrate 15 in FIG. 1; thin first transparent conductors 20; machine coated light modulating layer 30; and printed second conductors 40 permits the fabrication of a low cost flexible display. Dark layer 35 provides a simple and effective way to improve the contrast of such displays. Small displays according to the present invention can be used as electronically rewritable tags for inexpensive, limited rewrite applications.

Figure 2:
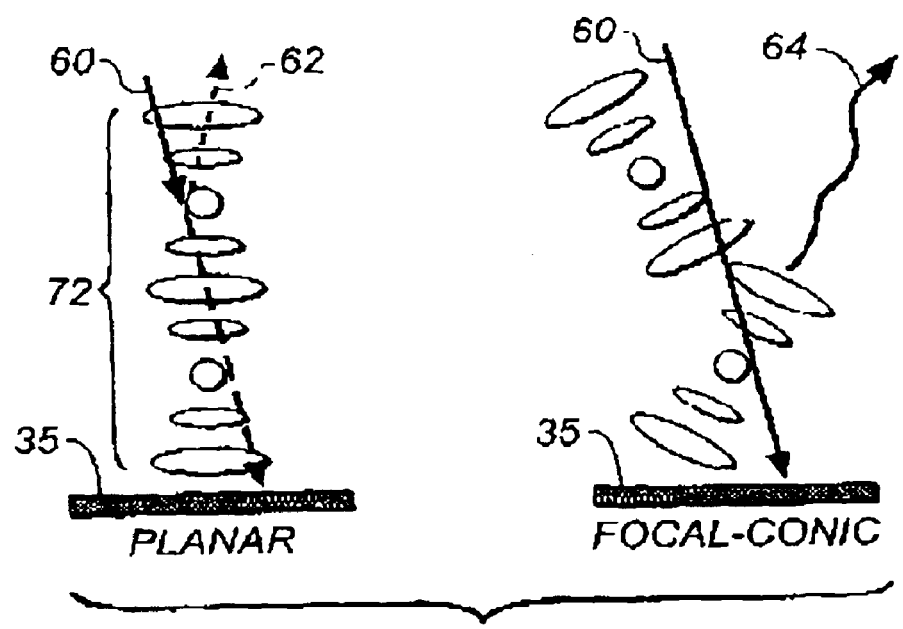
FIG. 2 is a schematic sectional view of a chiral nematic material in a planar and focal-conic state responding to incident light.

FIG. 2 is a schematic diagram of a chiral nematic material that is used in the light modulating layer 30 of FIG. 1. The chiral nematic material has a planar and focal-conic state responding to incident light. In the figure on the left, after a high voltage field has been applied and quickly switched to zero potential, the liquid crystal molecules become planar liquid crystals 72, which reflect portions of incident light 60 as reflected light 62. In the figure on the right side of FIG. 2, upon application of a lower voltage field the molecules of the chiral nematic material break into weakly forward scattering cells known as focal conic liquid crystals 74. Increasing the time duration of a low-voltage pulse progressively drives the molecules that were originally in a reflective planar state 72 towards a fully evolved and light scattering focal conic state 74.

In this invention, the dark layer 35 of FIG. 1 is positioned on the side opposing the incident light 60. In the fully evolved focal-conic state 74 the cholesteric liquid crystal is light scattering and incident light 60 is scattered to and absorbed by dark layer 35 to create the appearance of a black image. Progressive evolution towards the focal-conic state causes a viewer to perceive reflected light 62 that transitions to black as the cholesteric material changes from reflective planar state 72 to a fully evolved light scattering focal-conic state 74. When the field is removed, light modulating layer 30 maintains a given optical state indefinitely. The states are more fully discussed in U.S. Pat. No. 5,437,811 issued Aug. 1, 1995 to Doane et al.

If the indices of refraction between the polymers used in light modulating layer 30 and dark layer 35 in FIG. 1 do not match, some incident light 60 is reflected back as back scatter light 64 when light modulating layer 30 is in the focal-conic state. Therefore, it is highly desirable to have the same index of refraction in both polymeric binders. It is also highly desirable for the index of refraction of the first transparent conductor and the dark layer to be substantially the same. Back scatter light 64 reduces light absorbance, creating a gray image instead of a black image. Incident light 60 passing through light modulating layer 30 in the focal conic state is very effectively absorbed by dispersed submicron (nano-particle) carbon in a polymer (gelatin) common with light modulating layer 30, eliminating back scatter light 64.

In a preferred embodiment, the dark layer 35 comprises milled non-conductive pigments. The materials are milled below 1 micron to form "nan-opigments". Such pigments are effective in absorbing wavelengths of light in very thin (sub micron) layers. In a preferred embodiment, dark layer 35 absorbs all wavelengths of light across the visible light spectrum (400 nanometers to 700 nanometers wavelength).

Figure 3:
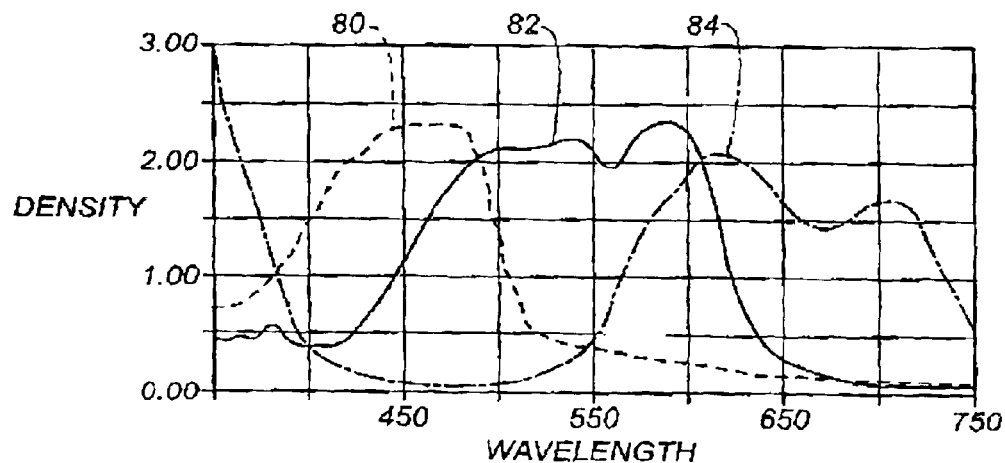
FIG. 3 is a set of spectra for various individual pigment dispersions according to the present invention.

FIG. 3 is an absorbance set of spectrum for pigment dispersions. In the embodiment of FIG. 3, the three different pigments are a Yellow pigment 80, which is a Pigment Yellow 74 milled to median diameter of 120 nanometers, a magenta pigment 82, which is a Pigment Violet 29 milled to a median diameter of 210 nanometers, and cyan pigment 84 is a Sunfast® Blue Pigment 15:4 pigment milled to a median diameter of 110 nanometers.

Figure 4:
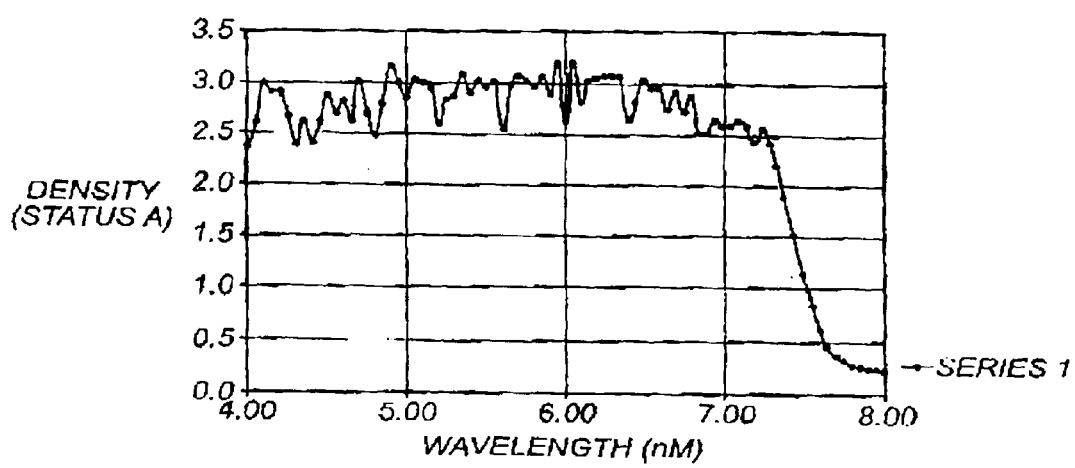
FIG. 4 is the spectrum for a mixture of the pigments of FIG. 3.

FIG. 4 shows a mixture of pigments 80, 82 and 84 that has uniform light absorption across the visible spectrum (400–700 nanometer wavelength of light). Such mixtures are useful in creating dark layer 35. Such pigments are readily available and are designed to be light absorbing across the visible spectrum. In addition such pigments are inert and do not carry electrical fields.

The preferred color of the pigment or pigment combination is black, so that when incorporated into the coating, it provides a high-contrast background for an image in the display. Suitable pigments used in this invention can be any colored materials which are practically insoluble in the medium in which they are incorporated. The preferred pigments are organic in which carbon is bonded to hydrogen atoms and at least one other element such as nitrogen, oxygen and/or transition metals. The hue of the organic pigment is primarily defined by the presence of one or more chromophores, a system of conjugated double bonds in the molecule, which is responsible for the absorption of visible light. Suitable pigments include those described in *Industrial Organic Pigments: Production, Properties, Applications* by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolo-pyrrole, and thioindigo, and anthriquinone pigments such as anthrapyrimidine, triarylcarbonium and quinophthalone.

Preferred pigments are the phthalocyanines such as Pigment Blue 15, 15:1, 15:3, 15:4 and 15:6, anthraquinones such as Pigment Blue 60, quinacridones such as Pigment Red 122, Azos such as Pigment Yellow 74 and Pigment Yellow 155, as listed in NPIRI *Raw Materials Data Handbook*, Vol. 4, *Pigments*, 1983, National Printing Research Institute. These pigments have a hue sufficient so that when combined in certain proportions, give an essentially neutral hue of the binder layer and are easily dispersed in an aqueous solution. Preferably, a dark layer in the display provides a background that provides a background that provides a substantially neutral optical density such that there is variability of less than +/−20% from the mean optical density over at least 80% of the visible spectrum from 400 to 700 nm.

The colorants can be incorporated into the imaging element by direct addition of the colorant to a coating melt by mixing the colorant with an aqueous medium containing gelatin or other hydrophilic colloid. The colorant can also be mixed with an aqueous solution of a water-soluble or water-dispersible surfactant or polymer, and passing the premix through a mill until the desired particle size is obtained. The mill can be any high-energy device such as a colloid mill, high-pressure homogenizer, or the like. Alternatively, but less preferably, pigments can also be dispersed in an organic solvent.

In the preferred embodiment, the colorant is dispersed in a binder in the form of a solid particle dispersion as follows. Such dispersions are formed by first mixing the colorant with an aqueous solution containing a water-soluble or water-dispersible surfactant or polymer to form a coarse aqueous premix, and adding the premix to a mill. The amount of water-soluble or water-dispersible surfactant or polymer can vary over a wide range, but is generally in the range of 0.01% to 100%, preferably about 0.3% to about 60%, and more preferably 0.5% to 50%, the percentages being by weight, based on the weight of the colorant useful in this application.

The mill can be for example, a ball mill, media mill, attritor mill, vibratory mill or the like. The mill is charged with the appropriate milling media such as, for example, beads of silica, silicon nitride, sand, zirconium oxide, yttria-stabilized zirconium oxide, alumina, titanium, glass, polystyrene, etc. The bead sizes typically range from 0.25 to 3.0 mm in diameter, but smaller media can be used if desired. The premix is milled until the desired particle size range is reached.

The solid colorant particles are subjected to repeated collisions with the milling media, resulting in crystal fracture, deagglomeration, and consequent particle size reduction. The solid particle dispersions of the colorant should have a final average particle size of less than the thickness of the dried dark layer, preferably less than 50 percent of the thickness of the dried dark layer. The particles should, therefore, have a median diameter of less than 2 microns, preferably between 0.01 and 2 micron, and most preferably between 0.01 and 1 micron. Most preferably, the median diameter of the solid colorant particles are of sub-micron or "nanoparticle" average size. Solid particle median diameters of between 0.01 and 0.5 micron provides the best pigment utilization and have a reduction in unwanted light absorption compared to pigments with a median particle size greater than 1 micron. By the term "nanopigment particles" is meant that the median size of the particles is less than 1 micron, but that particles greater than 1 micron may be present.

Surfactants, polymers, and other additional conventional addenda may also be used in the dispersing process described herein in accordance with prior art solid particle dispersing procedures. Such surfactants, polymers and other addenda are disclosed in U.S. Pat. Nos. 5,468,598, 5,300, 394, 5,278,037, 4,006,025, 4,924,916, 4,294,917, 4,940,654, 4,950,586, 4,927,744, 5,279,931, 5,158,863, 5,135,844, 5,091,296, 5,089,380, 5,103,640, 4,990,431, 4,970,139, 5,256,527, 5,089,380, 5,103,640, 4,990,431, 4,970,139, 5,256,527, 5,015,564, 5,008,179, 4,957,857, and 2,870,012, British Patent specifications Nos. 1,570,362 and 1,131,179 referenced above, the disclosures of which are hereby incorporated by reference, in the dispersing process of the colorants.

Additional surfactants or other water-soluble polymers may be added after formation of the colorant dispersion, before or after subsequent addition of the colorant dispersion to an aqueous coating medium for coating onto an imaging element support. The aqueous medium preferably contains other compounds such as stabilizers and dispersants, for example, additional anionic, nonionic, zwitterionic, or cationic surfactants, and water-soluble binders such as gelatin as is well known in the imaging art. The aqueous coating medium may further contain other dispersions or emulsions of compounds useful in imaging.

The nano-particles in such dispersions require high amounts of surfactant to prevent flocculation. Preferably, the binder for a dark layer according to the present invention is gelatin which binds up surfactant in the mixture used to create dark layer. If the gelatin concentration is too low high concentrations of surfactant on the surface of dark layer prevents subsequent layers from adhering to the surface of dark layer. The amount of binder in the coating must also be low to prevent an increase in drive voltage. It was found experimentally that the polymer binder, gelatin, should be provided at a 1:1 ratio with the pigment to create a surface that has good bond strength to subsequent applied layers and minimize increases in drive voltage.

In application, the dark layer of the present invention should be as thin as possible to not increase drive voltage while providing an acceptable degree of light absorption. In the preferred embodiment, light modulating layer is between 4 and 10 microns thick. The state changing field for cholesteric materials is typically 10 volts per micron coating thickness. Because dark layer is disposed between the two field carrying conductors, the layer should be significantly thinner than the light modulating layer. In practice, dark layer should be less than 1.0 micron, preferably 0.5 microns or less in thickness. The thickness of the dark layer is preferably less that 25%, more preferably less than 10%, of the light modulating layer. It is of further use that the optical density of dark layer be high enough to obscure visible features behind dark layer. The target optical density for dark layer should be greater than 1.0 optical density and preferably 2.0 optical density.

Referring again to FIG. 1, dark layer 35 of FIG. 1 is coated over light modulating layer 30 to provide a light absorbing layer which provides a high contrast dark state to reflected light 62, as shown in FIG. 2 in cooperation with FIG. 1. The coating of dark layer 35 can be simultaneous with the deposition of light modulating layer 30 or as a separate step. In a preferred embodiment, multi-layer photographic coating equipment provides light modulating layer 30 and dark layer 35 as two co-deposited layers. Light modulating layer 30 in the preferred embodiment is approximately 9 microns thick. In the invention, dark layer 35 is has an optical density of 2.0, is less than or equal to 0.50 microns in thickness, and does not carry electrical fields outside areas defined by two conductors. Under these conditions, dark layer 35 is significantly thinner than light modulating layer 30 and has minimal effect on the electrical field strength required to change cholesteric material state.

Figure 5:
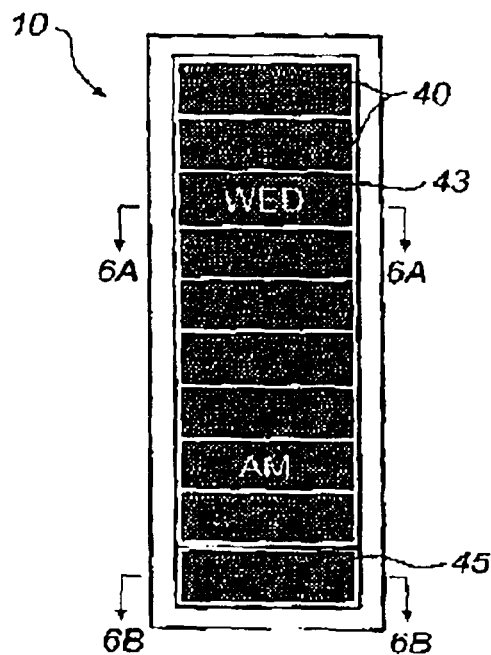
FIG. 5 is a top view of a second type of display useable with the present invention.
Figure 6A:
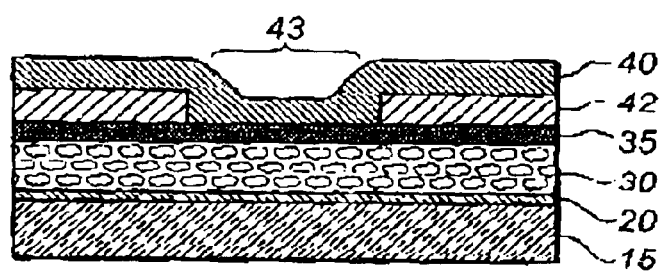
FIG. 6A is a partial cross-sectional view of the display of FIG. 5 taken along line A—A at a gap in the dielectric layer.
Figure 6B:
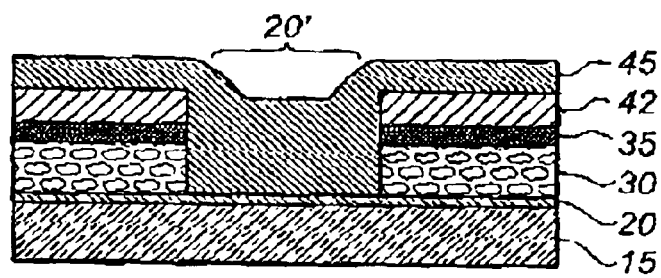
FIG. 6B is a partial cross-sectional view of the display of FIG. 5 taken along line B—B through a column trace.

In conjunction with cross-sectional views FIGS. 6A and 6B along A—A and B—B of FIG. 5, respectively, FIG. 5 is a top view of a second type of display useable with the present invention. In this type of display, first transparent conductor 20, on a transparent substrate 15, is a continuous unpatterned layer of transparent conductive material that covers the entire surface of display 10. Light modulating layer 30 covers the first transparent conductor 20. Dielectric layer 42 is formed by printing over light modulating layer 30, with gaps in the form of indicia acting as through via 43. Second conductors 40 are separate blocks of conductive material that cover through via 43. The areas of the light modulating layer 30 under through via 43 will be responsive to an electrical field formed between first transparent conductor 20 and second conductors 40. Layers are removed down to the first transparent conductor 20 to create exposed conductor 20' which is printed over by conductive material to create a single column contact 45. Dark layer 35 provides an opaque surface that conceals gaps between second conductors 40 and column contacts 45.

FIG. 6A is a partial cross sectional view of the display of FIG. 5 taken along line A—A at a through via 43 in the dielectric layer 42. Through via 43 is in the shape of indicia, such as an alpha-numeric character or a symbol. Dielectric layer 42 is for instance 25 microns, which is thick enough to separate second conductor 40 from first transparent conductor 20 so that light modulating layer 30 is unresponsive to an electrical field applied between first transparent conductor 20 and second conductor 40. A writing filed is sufficient to change the state of light modulating layer 30 in the absence of the dielectric layer. At through via 43, the first transparent conductor 20 and second conductors 40 are in close proximity to light modulating layer 30 and can change optical state by application of a voltage across conductors 20 and 40.

A dark layer 35 in FIG. 6A is disposed between second conductors 40 and light modulating layer 30. Dark layer 35 is a thin as is possible, and should provide high light absorption, preferable greater than 1.50 Optical Density. Dark layer 35 is formed of materials that do not carry an electric field applied between first transparent conductor 20 and second conductor 40.

Figure 7:
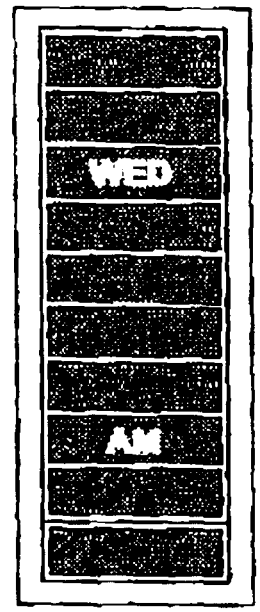
FIG. 7 is a front view of a comparative display with a field-carrying darkness enhancing layer.

In comparison to the invention, in which the dark layer comprises non-field carrying pigments, FIG. 7 is a front view of a display with field-carrying pigments. The field-carrying dark layer 35 in FIG. 6A is made with carbon in a polymer binder, which is electrically non-conductive, but a field-carrying material. A carbon (field carrying) dark layer 35 will carry applied electrical fields outside the area formed by first transparent conductors 20 and through via areas in second conductor 40. Material in light modulating layer 30 responds to the expanded electrical field, and changes state in areas not defined by the two conductors. The electrical field blooming degrades the legibility of indicia in displays. The degraded image of display 10 in FIG. 7 can be compared with displays having non-field carrying dark layers in FIG. 5. It is advantageous to use non field-carrying made from non-conductive pigments to form dark layer 35 as shown in FIG. 6A.

FIG. 6B is a second sectional view of the display of FIG. 5 at column contact 45. Layers above first transparent conductor 20, including dark layer 35, are removed to create exposed first conductor 20'. Conductive material is printed over first transparent conductor 20 to create a single column contact 45. The optical state of indicia are changed by applying fields to first transparent conductor 20 through column contact 45 and to individual connections to each second conductor 40.

Figure 8:
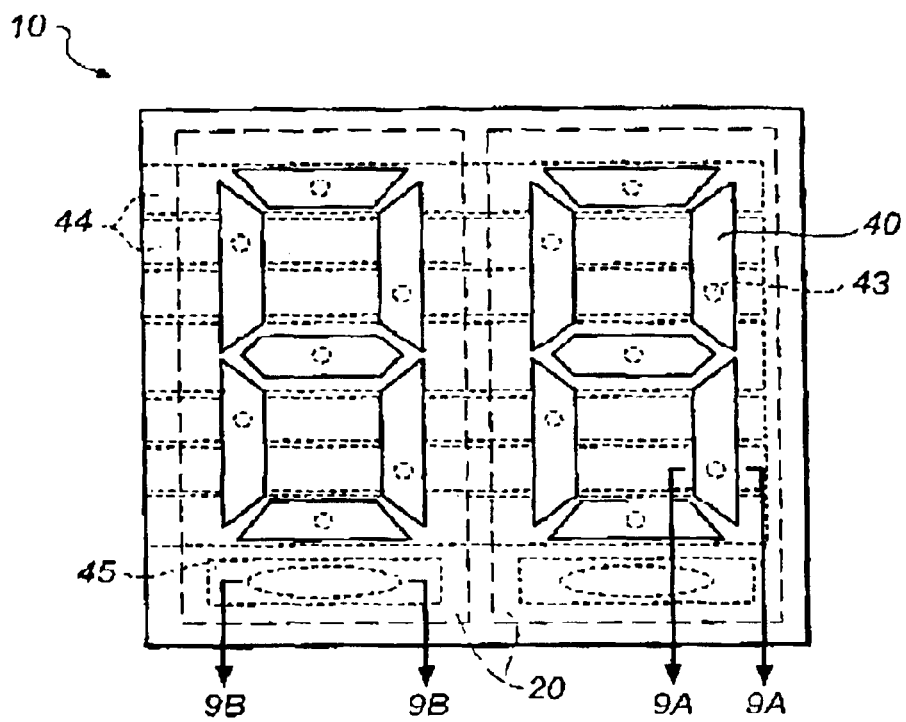
FIG. 8 is a top view of a seven-segment display having the structure shown in FIG. 1.
Figure 9A:
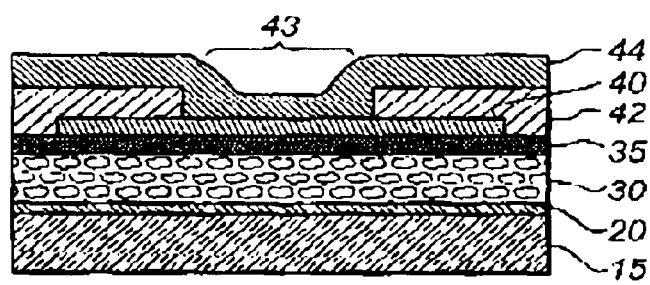
FIG. 9A is a partial cross-sectional view of the display of FIG. 8 taken along lines A—A in FIG. 8 at a gap in the dielectric layer.
Figure 9B:
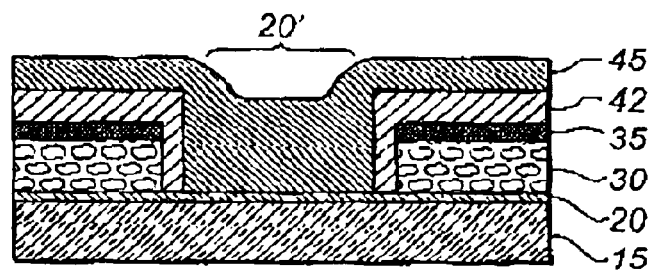
FIG. 9B is a partial cross-sectional view of the display of FIG. 8 taken along line B—B at a column trace.

Referring to FIGS. 8, 9A and 9B in conjunction, a seven-segment display useable with the present invention and having the structure shown generally in FIG. 1 will be described. First transparent conductors 20 over a transparent substrate 15 are comprised of a patterned layer of conductive material to form one common conductor for each 7-segment character. FIG. 9A shows a partial cross sectional view of the display of FIG. 8 taken along lines A—A at a gap in the dielectric layer 42. Light modulating layer 30 is over-coated with dark layer 35. Conductive material is used to print individual second conductors 40 for each segment on display 10 over dark layer 35. The ratio of gelatin to nano-pigment is controlled so that there is good adhesion of second conductors 40 to dark layer 35. Dielectric layer 42 covers all of the individual second conductors 40, and through via 43 in dielectric layer 42 allow each second conductor 40 to be connected to a printed row contact 44. Row contacts 44 connect the commonly positioned segments in all of the 7-segment characters together. FIG. 9B is a partial cross sectional view of the display of FIG. 8 taken along line B—B at a column contact. Materials above first transparent conductor 20, including dark layer 35, have been removed to create exposed first conductor 20'. Conductive material is printed over exposed first conductor 20' to form column contacts 45. The completed display 10 in this embodiment includes a set of 7-segment characters connected to form a matrix display. Second conductors in seven-segment displays are separated from each other, and require operative material be limited to areas defined by the intersection of first and second conductors.

Figure 10A:
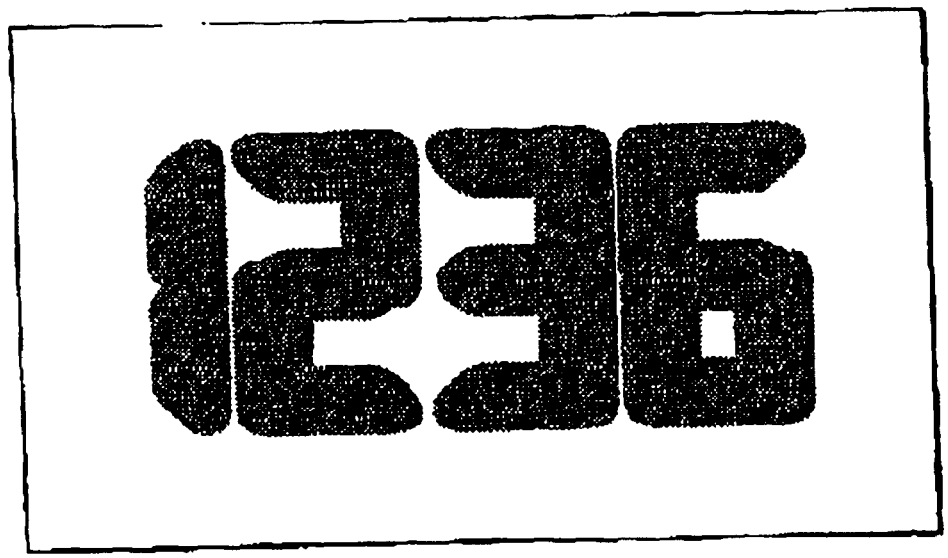
FIG. 10A is a comparative written seven-segment display having a conductive dark layer.
Figure 10B:
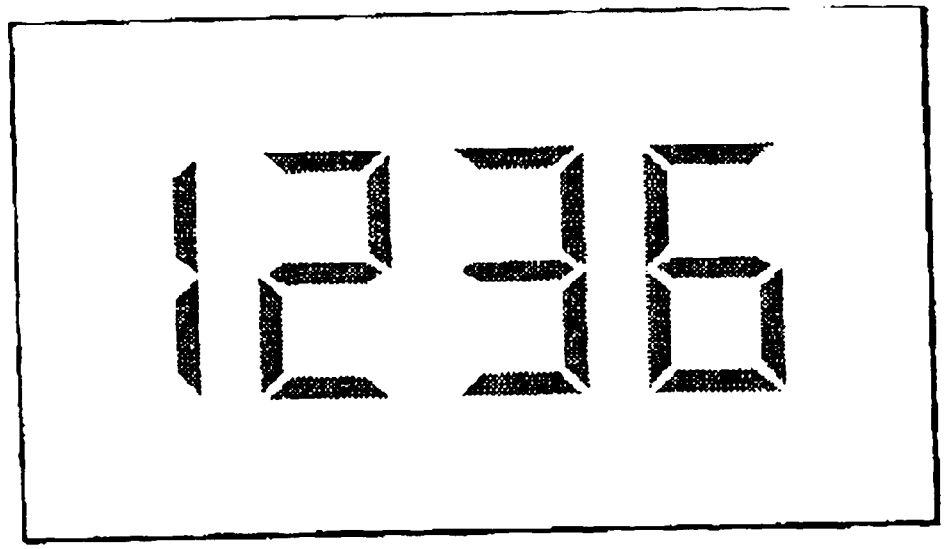
FIG. 10B is a written seven-segment display in accordance with the present invention having a non-conductive dark layer.

For comparison to the present invention, FIG. 10A is a written seven-segment display having a conductive dark layer. The field carrying dark layer in FIG. 10A is made with carbon, a field conducting material, in a polymer binder. The field carrying dark layer carries applied electrical fields outside the perimeter formed by the intersection of first transparent conductors and second conductors. Cholesteric material in light modulating layer outside the defined areas responds to the expanded electrical field, and changes state outside areas defined by the two conductors. The segments of the display are blurred, reducing the legibility of indicia in displays. FIG. 10B is a written seven-segment display in accordance with the present invention having a non-conductive dark layer formed of nano-pigment particles. The blurry characters in FIG. 10A can be compared with well-defined characters of the display with non field-carrying pigments in FIG. 10B.

Another aspect of the present invention relates to a processing method involving sequentially or simultaneously depositing coatings of the state changing layer and the dark layer prior to applying the second conductor. It is especially advantageous to employ substantially aqueous coatings of the state changing layer and the dark layer. Preferably, the state changing layer and the dark (or non-conductive, non field spreading) layer both comprise gelatin as a binder. It is especially advantageous for the state changing layer and the dark layer to be simultaneously coated. Furthermore, the transparent first conductor, for example made from polythiophene or other coatable conductor material, can be coated simultaneously with the state changing layer and the dark layer.

In one embodiment, the display is in the form of a web that is sequentially moved through one or more stations which sequentially or simultaneously deposits the state changing layer and the non-conductive, non field spreading layer. The first transparent conductor can be indium-tin-oxide or other suitable material that is sputtered to form the desired conductor pattern over the transparent support prior to sequentially or simultaneously depositing the state changing layer and the non-conductive, non field spreading layer. In another embodiment of the invention, the first and second conductors in the display can be patterned to produce an addressable matrix.

EXAMPLE 1

This example illustrates the preparation of pigment dispersions suitable for use in a dark layer of a display according to the present invention. A dispersion of colorant Pigment Yellow 74 was made by combining 50 g Pigment Yellow 74 (Sun Chemical Corp.), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 12% pigment by weight, with an average particle size less than 0.2 microns.

A set of experimental dispersions were made of various pigments milled to less than a micron mean diameter. A dispersion of colorant Pigment Blue 15:4 was made by combining 50 g Sunfast Blue® Pigment Blue 15:4 (Sun Chemical Corp), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 12% pigment by weight, with an average particle size less than 0.2 microns.

A dispersion of colorant Pigment Red 122 was made by combining 50 g Sunfast® Magenta Pigment Red 122 (Sun Chemical Corp.), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 12% pigment by weight, with an average particle size less than 0.2 microns.

EXAMPLE 2

An experiment was conducted to determine if an emulsion of pigment particles could meet the design requirements of 2.0 optical density at 0.5 micron dry thickness. A solution was made having 2% dissolved gelatin, 0.80% Sunfast® Blue Pigment Blue 15:4 milled to a 110 nanometer mean diameter, 0.66% Pigment Violet 29 prepared in the same manner as the dispersions of Example 1 and milled to a 210 nanometer mean diameter and 0.56% Pigment Yellow 74 milled to a 120 nanometer mean diameter. The emulsion was coated onto a sheet of clear plastic at a 25 micron wet thickness and dried. The resulting layer was approximately 0.8 m microns thick and had a 3.50 optical density. Scaling the coating thickness linearly with optical density to an optical density of 2.0 showed the emulsion could achieve 2.0 Optical Density in under 0.5 microns layer thickness.

An emulsion having an equivalent dry laydown weight was machine coated simultaneous with deposition of a light modulating layer on photographic film coating equipment. The resulting coatings provided a high optical contrast between the focal-conic and planar (reflective) states. Increase in the electrical field strength were small. The layer was not field carrying, meaning that no cholesteric material was changed outside field lines parallel to an applied electrical field.

The invention has been described in detail with particular reference to certain preferred embodiments thereof, but it will be understood that variations and modifications can be effected within the spirit and scope of the invention.

PARTS LIST

| | |
|---|---|
| 10 | display |
| 15 | display substrate |
| 20 | first transparent conductors |
| 20' | exposed first conductors |
| 30 | light modulating layer |
| 35 | dark layer |
| 40 | second conductors |
| 42 | dielectric layer |
| 43 | through via |
| 44 | row contacts |
| 45 | column contact |
| 60 | incident light |
| 62 | reflected light |
| 64 | back-scatter light |
| 72 | planar liquid crystal |
| 74 | focal conic liquid crystal |
| 80 | yellow nano-pigment |

-continued

PARTS LIST

| | |
|---|---|
| 82 | magenta nano-pigment |
| 84 | cyan nano-pigment |

What is claimed is:

1. A display having polymer dispersed liquid crystals, comprising:
   a) a transparent substrate;
   b) a state changing layer comprising a polymer-dispersed cholesteric liquid crystal disposed over the transparent substrate and defining first and second surfaces, the first surface being nearer the transparent substrate, such state changing layer of polymer-dispersed cholesteric liquid crystal having more than one stable optical state in the absence of an electrical field;
   c) a first transparent conductor disposed on the same side of the display as the first surface of the state changing layer, between the state changing layer and the transparent support;
   d) a second conductor over the second surface of the state changing layer such that when an electric field is applied between the first and second conductors, the cholesteric liquid crystals change state; and
   e) an electrically non-conductive, non-field-spreading layer comprising pigment particles in a binder disposed between the state changing layer of polymer-dispersed cholesteric liquid crystal and the second conductor, thereby providing a light-absorbing layer.

2. The diaplay of claim 1 wherein said non-field-spreading layer is light absorbing in the essentially absence of carbon black.

3. The display of claim 1 wherein said non-field-spreading layer comprises gelatin as a binder.

4. The display of claim 1 wherein said a state changing layer comprises a cholesteric liquid crystal dispersed in a material comprising gelatin.

5. The display of claim 1 wherein said non-field-spreading layer has a thickness less than 1.0 micron.

6. The display of claim 1 wherein the thickness of the non-field-spreading layer is less that 25% of the state changing layer.

7. The display of claim 1 wherein the non-field-spreading layer has an optical density greater than 1.0.

8. The display of claim 7 wherein the non-field-spreading layer has an optical density of 1.8 or greater.

9. The display of claim 1 wherein the non-field-spreading layer comprises a combination of at least two different pigments which have different hues.

10. The display of claim 1 wherein the non-field-spreading layer comprises a combination one, two, or three different pigments which have different hues.

11. The display of claim 1 wherein the non-field-spreading layer comprises cyan, magenta, and yellow pigments.

12. The display of claim 1 wherein the non-field-spreading layer comprises a combination of pigment particles that provide a substantially neutral hue.

13. The display of claim 1 wherein the non-field-spreading layer provides a background that is substantially neutral to the human eye.

14. The display of claim 1 wherein the non-field-spreading layer provides a background that provides a substantially neutral optical density such that there is variability of less than +/−20% from the mean optical density over at least 80% of the visible spectrum from 400 to 700 nm.

15. The display of claim 1 wherein the pigment particles have a median particle diameter of less than 2 microns.

16. The display of claim 15 wherein the median particle diameter of the pigment particles is between 0.01 and 0.5 microns.

17. The display of claim 15 wherein the median particle diameter is less than 50 percent of the thickness of the non-conductive, non-field-spreading layer.

18. The display of claim 1 wherein the the polymer-dispersed cholstric liquid crystal comprises a polymer that is also used as the binder fox the pigment particles.

19. The display of claim 17 wherein said same polymer is gelatin.

20. The display of claim 1 wherein the respective indices of refraction of the first transparent conductor and the non-conductive, non-field-spreading layer are substantially the same.

21. A method of making a display comprising polymer-dispersed liquid crystals which display comprising, from top to bottom, a transparent substrate, a first transparent conductor, a state changing layer, said state changing layer comprising polymer-dispersed liquid crystal having first and second optical states in the absence of an electrical field, an electrically non-conductive, non-fieldspreading layer comprising sub-micron particles, and a second conductor, which method comprises sequentially or simultaneously depositing coatings of the state changing layer and the non-conductive, non-field-spreading layer prior to applying the second conductor.

22. The method of claim 21 wherein the state changing layer and the non-conductive, non field spreading layer are both substantially aqueous coatings.

23. The method of claim 21 wherein the state changing layer and the non-conductive, non field spreading layer both comprises gelatin as a binder.

24. The method of claim 21 wherein the display is in the form of a web that is sequentially moved through one or more stations which sequentially or simultaneously deposits the state changing layer and the non-conductive, non field spreading layer.

25. The method of claim 21 wherein indium-tin-oxide is sputtered to form the first transparent ccmductor over the transparent support prior to sequentially or simultaneously depositing the state changing layer and the non-conductive, non field spreading layer.

26. The method of claim 21 further including patterning the first and second conductors in the display to produce an addressable matrix.

27. The method of claim 21 wherein the state changing layer and the non-conductive, non-field-spreading layer are simultaneously coated.

28. The method of claim 21 wherein the transparent first conductor is coated simultaneously coated with the state changing layer and the non-conductive, non-field-spreading layer.

29. A display having polymer-dispersed liquid crystals, comprising:

a) a transparent substrate;

b) a state changing layer comprising a polymer-dispersed cholesteric liquid crystal disposed over the transparent substrate and defining first and second surfaces, the first surface being nearer the transparent substrate, such state changing layer of polymer-dispersed cholesteric liquid crystal having more than one stable optical state in the absence of an electrical field, a planar and focal-conic state;

c) a first transparent conductor disposed on the same side of the display as the first surface of the state changing layer, between the state changing layer and the transparent support;

d) a second conductor over the second surface of the state changing layer such that when an electric field is applied between the first and second conductors, the cholesteric liquid crystals change state; and e) an electrically non-conductive, non-field-spreading layer having a thickness less than 1.0 micron and comprising pigment particles in a binder disposed between the state changing layer of polymer-dispersed cholesteric liquid crystal and the second conductor, thereby providing a light-absorbing layer, wherein the pigment particles comprise a combination of at lesat two different pigments which have different hues and wherein the median particle diameter of the pigment particles is less than 50 percent of the thickness of the non-conductive, non-field-spreading layer.

* * * * *